(12) United States Patent
Dwyer

(10) Patent No.: US 7,100,447 B2
(45) Date of Patent: Sep. 5, 2006

(54) SUPER INVAR MAGNETIC RETURN PATH FOR HIGH PERFORMANCE ACCELEROMETERS

(75) Inventor: Paul Dwyer, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 22 days.

(21) Appl. No.: 11/005,663

(22) Filed: Dec. 7, 2004

(65) Prior Publication Data

US 2006/0117853 A1 Jun. 8, 2006

(51) Int. Cl.
*G01P 15/08* (2006.01)
*G01P 15/13* (2006.01)

(52) U.S. Cl. ............... 73/514.23; 73/514.21; 73/514.36

(58) Field of Classification Search ............. 73/514.21, 73/514.23, 514.31, 514.29, 514.36, 493, 73/497, 514.38
See application file for complete search history.

(56) References Cited

U.S. PATENT DOCUMENTS

| | | | |
|---|---|---|---|
| 1,689,814 A * | 10/1928 | Brace | ............... 428/616 |
| 3,702,073 A * | 11/1972 | Jacobs | ............. 73/514.32 |
| 3,999,700 A | 12/1976 | Chalmers | |
| 4,182,187 A | 1/1980 | Hanson | |
| 4,250,757 A | 2/1981 | Hanson | |
| 4,394,405 A | 7/1983 | Atherton | |
| 4,400,979 A | 8/1983 | Hanson et al. | |
| 4,441,366 A | 4/1984 | Hanson | |
| 4,555,944 A | 12/1985 | Hanson et al. | |
| 4,555,945 A | 12/1985 | Hanson | |
| 4,592,234 A | 6/1986 | Norling | |
| 4,620,442 A | 11/1986 | MacGugan et al. | |
| 4,697,455 A | 10/1987 | Norling | |
| 4,726,228 A | 2/1988 | Norling | |
| 4,853,298 A * | 8/1989 | Harner et al. | ............... 428/630 |
| 4,872,342 A * | 10/1989 | Hanson et al. | ........... 73/514.29 |
| 4,932,258 A | 6/1990 | Norling | |
| 4,944,184 A | 7/1990 | Blake et al. | |
| 5,024,089 A | 6/1991 | Norling | |
| 5,085,079 A | 2/1992 | Holdren et al. | |
| 5,090,243 A | 2/1992 | Holdren et al. | |
| 5,097,172 A | 3/1992 | Becka | |
| 5,111,694 A | 5/1992 | Foote | |
| 5,182,949 A | 2/1993 | Rupnick et al. | |
| 5,203,210 A | 4/1993 | Terry et al. | |
| 5,212,984 A * | 5/1993 | Norling et al. | ............... 73/493 |
| 5,220,831 A | 6/1993 | Lee | |
| 5,532,665 A | 7/1996 | Foote et al. | |
| 6,727,787 B1 * | 4/2004 | Worth et al. | ................ 333/228 |
| 6,846,368 B1 * | 1/2005 | Katsuragi et al. | ........... 148/333 |

* cited by examiner

*Primary Examiner*—Helen Kwok
(74) *Attorney, Agent, or Firm*—Black Lowe & Graham PLLC

(57) ABSTRACT

A force rebalance accelerometer (20) includes a silicon dioxide-based proof mass (28) having capacitive elements (40) engaged with excitation rings (61) made from alloys of Super Invar. The magnet assembly includes an excitation ring, a magnet, and a pole piece (65). The Super Invar of the excitation rings (61) substantially matches the coefficient of thermal expansion of the silicon dioxide-based proof mass (28) to substantially reduce distortion signals caused by temperature changes. Movement of the accelerometer causes the capacitive elements (40) to produce a signal proportional to the movement acceleration and not by temperature changes experienced by the accelerometer.

20 Claims, 2 Drawing Sheets

SUPER INVAR MAGNETIC RETURN PATH FOR HIGH PERFORMANCE ACCELEROMETERS

BACKGROUND OF THE INVENTION

Force rebalance accelerometers which include a proof mass suspended between one or more magnet assemblies are generally known in the art. Examples of such accelerometers are disclosed in U.S. Pat. Nos. 4,182,187; 4,250,757; 4,394,405; 4,399,700; 4,400,979; 4,441,366; 4,555,944; 4,555,945; 4,592,234; 4,620,442; 4,697,455; 4,726,228; 4,932,258; 4,944,184; 5,024,089; 5,085,079; 5,090,243; 5,097,172; 5,111,694; 5,182,949; 5,203,210; 5,212,984; and 5,220,831, all herein incorporated by reference. Such force rebalance accelerometers normally include a proof mass, known to be formed from amorphous quartz, suspended by one or more flexures to enable the proof mass to deflect in response to forces or accelerations along a sensitive axis, generally perpendicular to the plane of the proof mass. At rest, the proof mass is normally suspended equidistantly between upper and lower excitation rings. Electrically conductive material forming pick-off capacitance plates, is disposed on opposing sides of the proof mass to form capacitive elements with the excitation rings. An acceleration or force applied along the sensitive axis causes the proof mass to deflect either upwardly or downwardly which causes the distance between the pick-off capacitance plates and the upper and lower excitation rings to vary. This change in the distance between the pick-off capacitance plates and the upper and lower excitation rings causes a change in the capacitance of the capacitive elements. The difference in the capacitances of the capacitive elements is thus representative of the displacement of the proof mass along the sensitive axis. This displacement signal is applied to a servo system that includes one or more electromagnets which function to return the proof mass to its null or at-rest position. The magnitude of the drive currents applied to the electromagnets, in turn, is representative of the acceleration or force along the sensitive axis.

The electromagnets are known to include a magnet formed from, for example, alnico, normally bonded to an excitation ring formed from a material having relatively high permeability, such as Invar, to form a magnetic return path. The materials used for the magnet and the excitation ring will have different coefficients of thermal expansion, since the materials are different. As such, the interface defined between the magnet and the excitation ring will be subject to stress as a function of temperature. Such stress over a period of time and/or temperature degrades the performance of the accelerometer.

In order to resolve this problem, compliant epoxies have been used to bond the magnet to the excitation ring. However, such compliant epoxies degrade the long term stability of the accelerometer. Moreover, the alloys used in the excitation ring do not optimally match the expansion coefficient of the silicon dioxide-based capacitance plates, creating temperature-induced false acceleration signal, compromising the precision and accuracy of motion-sourced acceleration.

SUMMARY OF THE EMBODIMENTS

Embodiments include a force rebalance accelerometer that more precisely and accurately provides accelerometer values attributable to changes in motion and not falsely signaled by changes in temperature. Embodiments more accurately provide true accelerometer readings due to changes in velocity by minimizing non-velocity related or noise related contributions that would otherwise falsely indicate a change in velocity. Embodiments include accelerometer components made from materials having substantially similar coefficients of thermal expansion.

Particular embodiments of the rebalance accelerometer include a cylinder or canister having a silicon dioxide-based proof mass with capacitive elements that engage with a magnet assembly made of Super Invar. The Super Invar alloys provide substantially similar coefficients of thermal expansion to the silicon dioxide-based proof mass. The proof mass is suspended by one or more flexures between stationary mounted upper and lower excitation rings. The proof mass is isolated from the interior walls of the cylinder via an air gap interposed between the proof mass and interior walls. The air gap is filled with an inert gas. Pick-off capacitance plates are formed or otherwise mounted to the opposing sides of the proof mass. The pick-off capacitance plates provide capacitance elements whose capacitance varies in response to displacement of the proof mass to provide a displacement signal proportional to the acceleration of the movement experienced by the rebalance accelerometer. False signals mimicking acceleration attributable to changing temperatures are substantially reduced in accelerometers of the particular embodiments made from materials having substantially similar coefficients of thermal expansion.

BRIEF DESCRIPTION OF THE DRAWINGS

The particular embodiments are described in detail below with reference to the following drawings.

DETAILED DESCRIPTION OF THE PARTICULAR EMBODIMENTS

Figure 1:
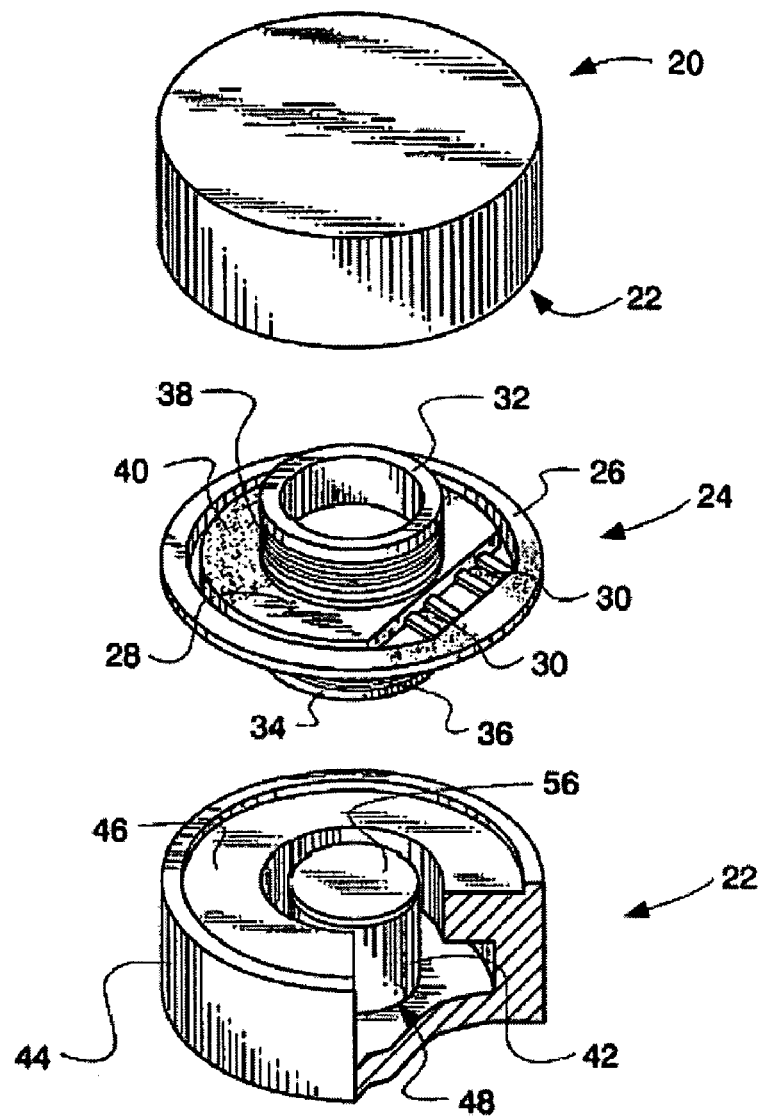
FIG. 1 is an exploded perspective view of a force rebalance accelerometer formed in accordance with a particular embodiment.

FIG. 1 illustrates a force rebalance accelerometer 20. The force rebalance accelerometer 20 includes one or more magnet assemblies 22 and a proof mass assembly 24. The proof mass assembly 24 includes a mounting ring 26 and a generally paddle-shaped proof mass 28. The proof mass 28 is suspended relative to the mounting ring 26 by way of a pair of flexures 30 to enable the proof mass 28 to rotate relative to the mounting ring 26. Cylindrically shaped bobbins 32 and 34 are formed on opposing surfaces of the proof mass 28. The bobbins 32 and 34 are used to carry torquer coils 36 and 38. A conductive material 40 is deposited on the opposing surfaces of the proof mass 28 to form pick-off capacitance plates.

Figure 2:
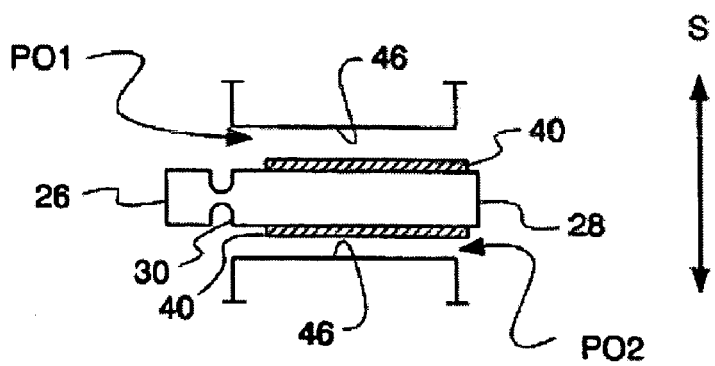
FIG. 2 is a partial cross-sectional view of the force rebalance accelerometer of FIG. 1.

The magnet assemblies 22 include a permanent magnet 42 and a generally cylindrical excitation ring or flux concentrator 44. The excitation ring 44 is configured to have a generally C-shaped cross section. The material for the excitation ring 44 is selected to have relatively high permeability, such as Super Invar, to form a magnetic return path. Inwardly facing surfaces 46 on the excitation rings 44 form in combination with the conductive material 40 on the opposing sides of the proof mass 28 form variable capacitance elements PO1 and PO2 as shown in FIGS. 1 and 2. A pole piece 65 is attached to the magnet 42.

Referring to FIG. 2, the proof mass 28 is shown at an at-rest or null position. In this position, the distance between the surfaces 46 of the upper and lower excitations rings 44 and the pick-off capacitance plates 40 are equal. Since capacitance is a function of the distance between the plates, the capacitance values of the capacitors PO1 and PO2 are equal during this condition.

In response to an acceleration or force along a sensitive axis S, generally perpendicular to the plane of the proof mass 28, the proof mass 28 moves toward one or the other of the excitation rings 44. This displacement of the proof mass 28 changes the respective distances between the surfaces on the pick-off capacitance plates 46 formed on the opposing sides of the proof mass 28 relative to the upper and lower excitation rings 44. This change in the distance results in a change in the capacitance of the capacitive elements PO1 and PO2. Circuitry for measuring this change in capacitance is disclosed in U.S. Pat. No. 4,634,965 herein incorporated by reference.

The difference in the values of the capacitances PO1 and PO2 is representative of the displacement of the proof mass 28 either upwardly or downwardly along the sensitive axis S. This displacement signal is applied to a servo system which includes the magnet assemblies 22 and the torquer coils 36 and 38 which form electromagnets to return the proof mass 28 to its null position. The magnitude of the drive current to the electromagnets is a measure of the acceleration of the proof mass 28 along the sensitive axis S.

Figure 3:
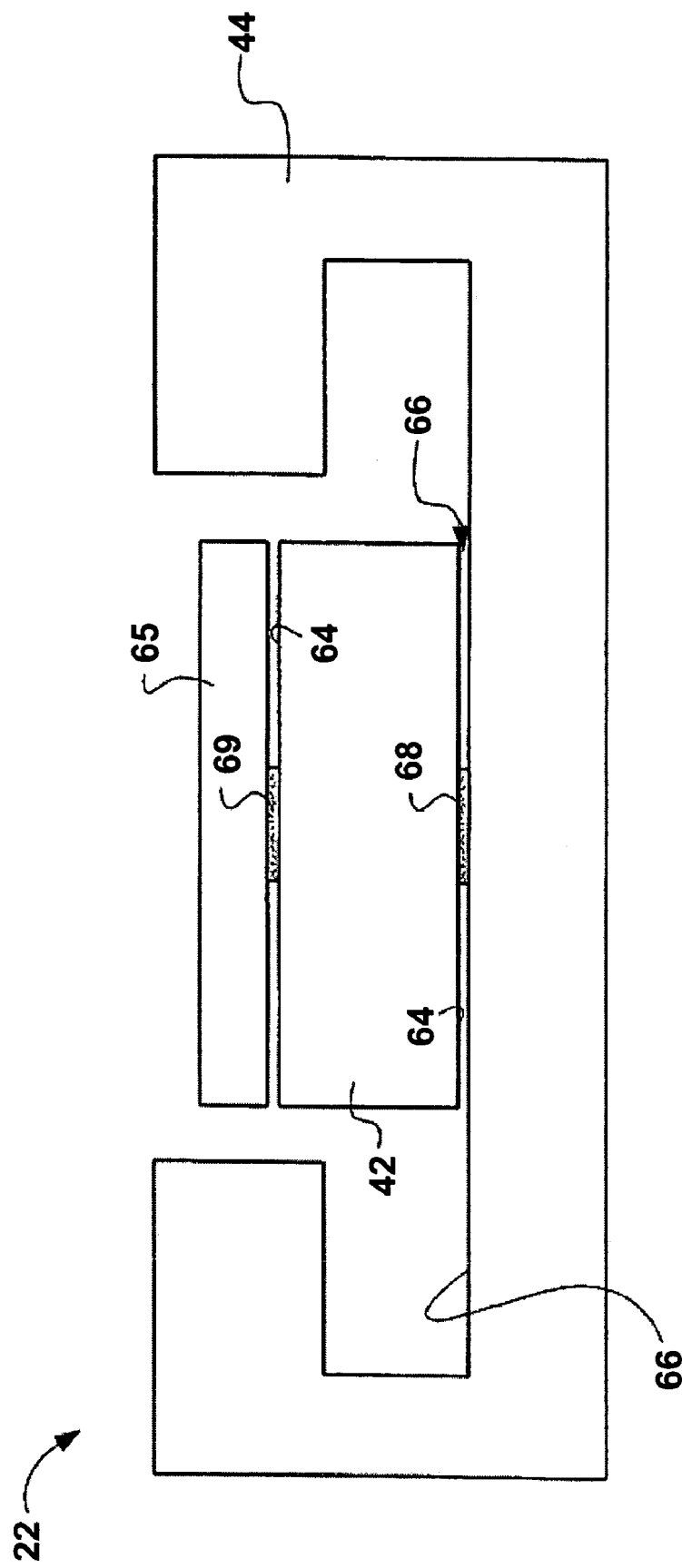
FIG. 3 is a cross-sectional view of the force rebalance accelerometer of FIG. 1.

As shown in FIG. 3 each magnet assembly 22 includes the excitation ring 44, the magnet 42 and a pole piece 65. The excitation ring 44 is formed in a generally cylindrical shape with a C cross section. The magnet 42 has opposing bonding surfaces 64 that are centrally secured to a base portion 66 of the excitation ring 44 via an adhesive patch 68. The pole piece 65 is secured to the magnet 42 by an adhesive patch 69.

To substantially reduce temperature-derived distortion signals, the excitation ring 44 is made from Super Invar alloys that substantially match the thermo coefficient of expansion of the silicon dioxide-based proof mass 28. Accordingly, movement of the proof mass 28 causes the capacitive elements 40 to produce a signal attributable to the motion experienced by the accelerometer 20, and not distorted signals caused by differences or changes in temperatures that the magnet assembly 22 or other components of the accelerometer 20 would experience.

The Super Invar used in the excitation ring 44 is an alloy of approximately 31% Nickel, 5% Cobalt, and 64% Iron.

Several modifications and variations of the present embodiments are possible in light of the above teachings. Other compositions of the Nickel-Cobalt-Iron Super Invar may be used. For example, an alloy composition of approximately 32.0% Nickel, 5.4% Cobalt, less than 1% Carbon, less than 1% Silicon, less than 1% Manganese, less than 1% Sulfur, less than 1% Chromium, less than 1% Aluminum, less than 1% Copper, and the remaining percentage balance Iron may be used.

Thus, it is to be understood that, within the scope of the appended claims, the invention may be practiced otherwise than as specifically described above.

While the preferred embodiment of the invention has been illustrated and described, as noted above, many changes can be made without departing from the spirit and scope of the invention. For example, another Super Invar alloy composition would include 31.75% Nickel, 5.36% Cobalt, 0.05% Carbon, 0.09% Silicon, 0.39% Manganese, 0.01% Sulfur, 0.03% Chromium, 0.07% Aluminum, 0.08% Copper, and the remaining percentage balance Iron.

Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
   a pair of magnetic assemblies, each assembly comprises a Super Invar alloy, each assembly includes an excitation ring and a magnet; and
   a proof mass having capacitance elements, the proof mass being suspended between the magnetic assemblies and the capacitance elements engaged with the excitation rings,
   wherein the magnetic assemblies, the proof mass, and the capacitance elements have substantially similar coefficients of thermal expansion.

2. The apparatus of claim 1, wherein the alloy comprises approximately 31% Nickel, 5% Cobalt, and 64% Iron.

3. The apparatus of claim 1, wherein the alloy comprises approximately 32.0% Nickel, 5.4% Cobalt, less than 1% Carbon, less than 1% Silicon, less than 1% Manganese, less than 1% Sulfur, less than 1% Chromium, less than 1% Aluminum, less than 1% Copper, and the remaining percentage balance Iron.

4. The apparatus of claim 1, wherein alloy comprises approximately 31.75% Nickel, 5.36% Cobalt, 0.05% Carbon, 0.09% Silicon, 0.39% Manganese, 0.01% Sulfur, 0.03% Chromium, 0.07% Aluminum, 0.08% Copper, and the remaining percentage balance Iron.

5. An accelerometer comprising:
   a pair of magnetic assemblies, each assembly comprises a Super Invar alloy, each assembly includes an excitation ring and a magnet; and
   a proof mass having capacitance elements, the proof mass being suspended between the magnetic assemblies and the capacitance elements engaged with the excitation rings,
   wherein the magnetic assemblies, the proof mass, and the capacitance elements have substantially similar coefficients of thermal expansion.

6. The accelerometer of claim 5, wherein the alloy comprises approximately 31% Nickel, 5% Cobalt, and 64% Iron.

7. The accelerometer of claim 5, wherein the alloy comprises approximately 32.0% Nickel, 5.4% Cobalt, less than 1% Carbon, less than 1% Silicon, less than 1% Manganese, less than 1% Sulfur, less than 1% Chromium, less than 1% Aluminum, less than 1% Copper, and the remaining percentage balance Iron.

8. The accelerometer of claim 5, wherein alloy comprises approximately 31.75% Nickel, 5.36% Cobalt, 0.05% Carbon, 0.09% Silicon, 0.39% Manganese, 0.01% Sulfur, 0.03% Chromium, 0.07% Aluminum, 0.08% Copper, and the remaining percentage balance Iron.

9. A method of making an accelerometer comprising:
   preparing a magnetic assembly using a Super Invar alloy, the assembly having an excitation ring and a magnet;
   preparing a proof mass with capacitance elements, the proof mass and capacitance elements having substantially similar coefficients of thermal expansion to that of the Super Invar alloy; and
   suspending the proof mass near the assembly so that the capacitance elements engage with the excitation ring, wherein movement of the accelerometer generates signals from the capacitance elements engaging with the excitation ring.

10. The method of claim 9, wherein the proof mass is suspended between two magnetic assemblies.

11. The method of claim 10, wherein the capacitance elements are engaged with the excitation rings of each assembly.

12. The method of claim 9, wherein the alloy comprises approximately 31% Nickel, 5% Cobalt, and 64% Iron.

13. The method of claim 9, wherein the alloy comprises approximately 32.0% Nickel, 5.4% Cobalt, less than 1% Carbon, less than 1% Silicon, less than 1% Manganese, less than 1% Sulfur, less than 1% Chromium, less than 1% Aluminum, less than 1% Copper, and the remaining percentage balance Iron.

14. The method of claim 9, wherein alloy comprises approximately 31.75% Nickel, 5.36% Cobalt, 0.05% Carbon, 0.09% Silicon, 0.39% Manganese, 0.01% Sulfur, 0.03% Chromium, 0.07% Aluminum, 0.08% Copper, and the remaining percentage balance Iron.

15. An apparatus comprising:
a pair of magnetic assemblies, each assembly comprises Cobalt, each assembly includes an excitation ring and a magnet; and
a proof mass having capacitance elements, the proof mass being suspended between the magnetic assemblies and the capacitance elements engaged with the excitation rings,
wherein the magnetic assemblies, the proof mass, and the capacitance elements have substantially similar coefficients of thermal expansion.

16. An accelerometer comprising:
a pair of magnetic assemblies, each assembly comprises Cobalt, each assembly includes an excitation ring and a magnet; and
a proof mass having capacitance elements, the proof mass being suspended between the magnetic assemblies and the capacitance elements engaged with the excitation rings,
wherein the magnetic assemblies, the proof mass, and the capacitance elements have substantially similar coefficients of thermal expansion.

17. A method of making an accelerometer comprising:
preparing a magnetic assembly using a Cobalt alloy, the assembly having an excitation ring and a magnet;
preparing a proof mass with capacitance elements, the proof mass and capacitance elements having substantially similar coefficients of thermal expansion to that of the Cobalt alloy; and
suspending the proof mass near the assembly so that the capacitance elements engage with the excitation ring,
wherein movement of the accelerometer generates signals from the capacitance elements engaging with the excitation ring.

18. The method of claim 17, wherein the alloy comprises approximately 31% Nickel, 5% Cobalt, and 64% Iron.

19. The method of claim 18, wherein the alloy comprises approximately 32.0% Nickel, 5.4% Cobalt, less than 1% Carbon, less than 1% Silicon, less than 1% Manganese, less than 1% Sulfur, less than 1% Chromium, less than 1% Aluminum, less than 1% Copper, and the remaining percentage balance Iron.

20. The method of claim 18, wherein alloy comprises approximately 31.75% Nickel, 5.36% Cobalt, 0.05% Carbon, 0.09% Silicon, 0.39% Manganese, 0.01% Sulfur, 0.03% Chromium, 0.07% Aluminum, 0.08% Copper, and the remaining percentage balance Iron.

* * * * *